Nov. 22, 1927.
J. HOLTZMAN
CUTTING MECHANISM
Filed March 8, 1922
1,649,957
3 Sheets-Sheet 1
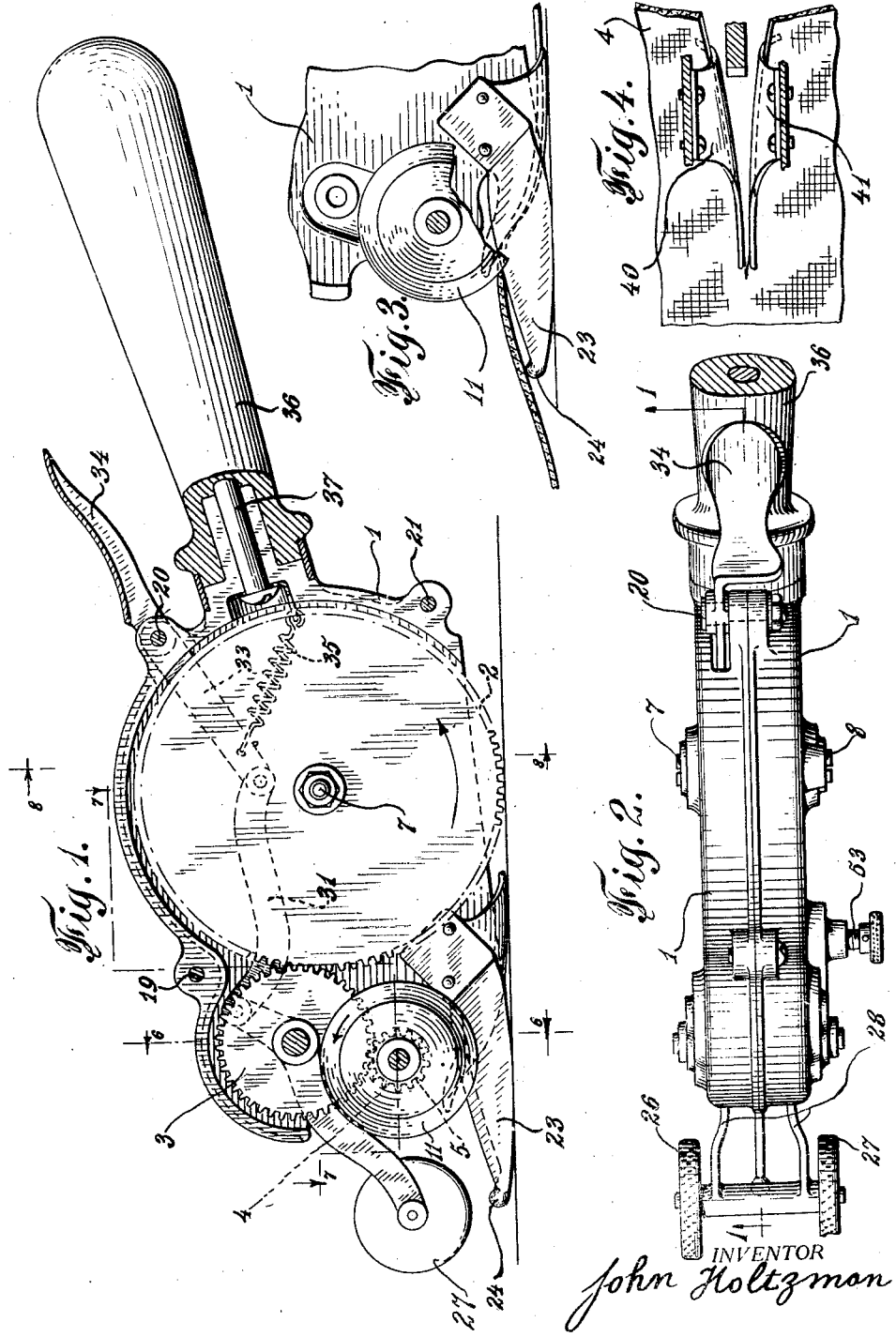
INVENTOR
John Holtzman

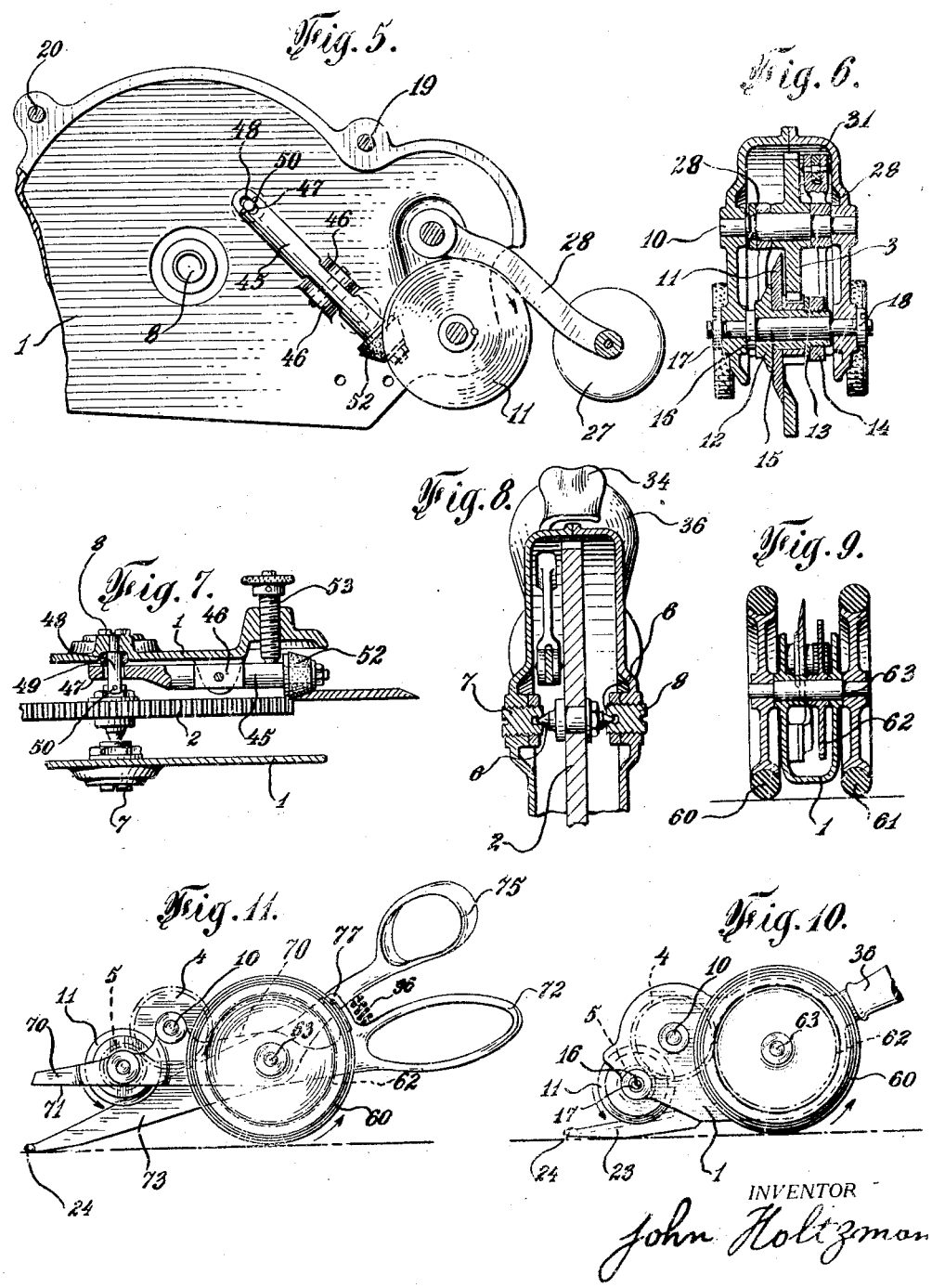

Nov. 22, 1927.  
J. HOLTZMAN  
1,649,957  
CUTTING MECHANISM  
Filed March 8, 1922   3 Sheets-Sheet 3

INVENTOR  
John Holtzman

Patented Nov. 22, 1927.

1,649,957

UNITED STATES PATENT OFFICE.

JOHN HOLTZMAN, OF NEW YORK, N. Y.

CUTTING MECHANISM.

Application filed March 8, 1922. Serial No. 542,198.

This invention relates to a cutting mechanism, more particularly to hand or machine operating machines for cutting cloth or other materials of various thicknesses or texture with comparatively little effort on the part of the operator.

One object of the invention is to provide a machine for cutting material in which one of the cutting edges consists of a rapidly revolving cutting disk, rotated by means of a series of gears; the travelling gear receiving its motive power from being rolled over a cutting table by hand and held in the frictional engagement therewith as are the wheels of a carpet sweeper or lawn mower or the like. The disk being placed against the upturned sharp edge of a knife blade, which is passed along the cutting table and the material passed between these two edges and cut or sliced into two parts.

Another object is the provision of a suitable sharpening means for the edge of the disk that may be applied whenever necessary, by simply bringing a grinding or sharpening stone or carborundum wheel in contact with a beveled edge of the disk and the disk rotated by moving the machine back and forth over the cutting table.

Another object is to provide suitable means for pressing or holding the material against the table at the point where it is to be cut so as to secure a clean even cut and to guide the cutting of the material. This means consisting of rollers, guided by the operator's hand by means of a suitable mechanism while guiding the machine over the table; to lower or raise the rollers to suit the requirements of different kinds of material and different thicknesses or layers that are to be cut.

Another object is the provision of a guiding means for the cut parts of the material to fold or steer the cut edges away from the driving gear and cause them to fold or be parted sufficiently so that the machine may be turned in any direction easily at the will of the operator, without interfering with or injuring the cut edges of the material by the driving gear.
Another object is the provision of a cutting mechanism in which may be combined the cutting operation of a sharp edged knife and a rotating disk on the one hand with a second sharp edged knife or blade on the other hand to co-operate and cut as do the blades of a pair of scissors. This mechanism being useful in cases where it is desired to cut slowly, complicated patterns from the material.

Another object is the provision of a cutting mechanism as described above in which the cutting disk may be rotated by means of an electric motor.

Other objects are readily suggested to those skilled in the art as will be apparent in the following description taken in connection with the accompanying drawings in which:

Fig. 1 is an elevation partly in section to show the operating gears and cutting parts;

Figure 2 is a top elevation of this machine;

Figure 3 is a detailed, side section of the cutting disk and knife showing how the material is cut;

Figure 4 is a detailed sectional top view of the guides for the material showing how the cut parts are separated;

Figure 5 is a fragmentary side view of the sharpening mechanism and the cutting disk;

Figure 12:
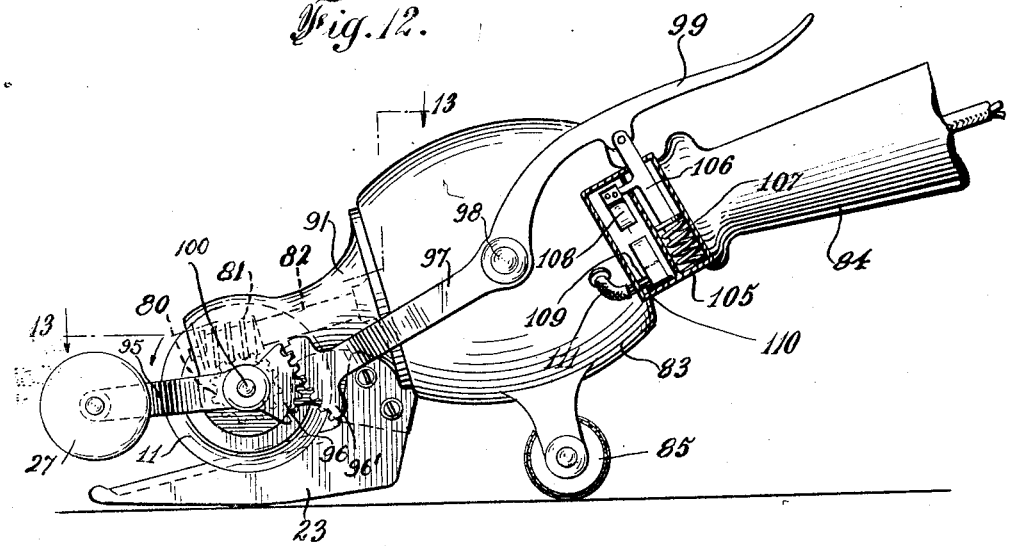
Figure 13:
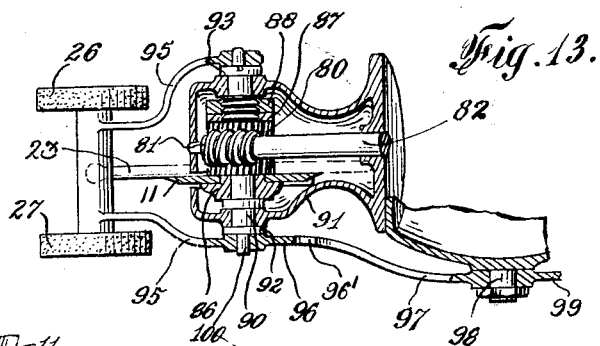
Figures 14, 15:
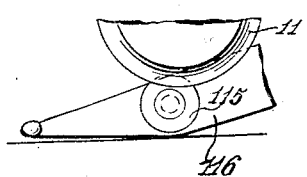

Figure 6 is a fragmentary cross-section taken on line 6—6 of Figure 1; Figure 7 is a fragmentary cross-section taken on line 7—7 of Figure 1; Figure 8 is a fragmentary cross-section taken on line 8—8 of Figure 1; Figure 9 is a side elevation of a modification of the invention showing two driving gears instead of one; Figure 10 is a cross-sectional view of the mechanism shown in Figure 9; Figure 11 is a side view of a second modified form of my invention showing a mechanism similar to that shown in Figures 9 and 10 with a scissor blade attached to form with the knife a pair of scissors; Figure 12 is a side view of a third modification of my invention similar to the preferred form of the invention shown in Figures 1 to 8 inclusive. but with the cutting disk driven by means of an electric motor. Figure 13 is a top view taken on the line 13—13 of Figure 12; Figure 14 is a fragmentary view of a fourth modification showing two rotating disks cooperating with each other in place of the disk and knife shown in the previous forms; Figure 15 is a plan view of Figure 14.

Referring now to Figures 1 to 8 inclusive, which is the preferred form of my invention, the housing 1 encloses the essential working parts, consisting of the driving gear 2, meshing with the gear 3, that in turn meshes with the pinion 5. The gear 2 is pivoted in the housing 1 by means of pin 6, secured to the gear and adjustable screw bearings 7 and 8 screwed into the housing and provided with lock nuts so that the gear may be centered in the proper position to mesh with gear 3. Gear 3 is similarly mounted on a spindle 10 secured in bearings in the housing 1 (see Figure 6). The pinion 5 is fastened with a cutting wheel or disk 11 on a bushing 12 by means of a nut 13 and a lock nut 14. This bushing 12 rotates on the spindle 15 that is provided with a shoulder 16, the purpose of which will be hereinafter described. The spindle 15 is secured in holes in the walls of the housing 1 by means of nuts 17 and 18 to clamp it securely there between and at the same time serve to clamp the two halves of the housing together. Other bolts 19, 20 and 21 being placed at the most advantageous positions on the outside periphery of the housing 1, to clamp the two halves of it together. The knife 23 is riveted to one side of the housing in such a position as to have its cutting edge in close contact with a portion of the cutting disk 11 as shown in Figures 1, 3 and 6. The knife 23 is provided with a beaded tip 24 so as to permit it to pass readily under the material 4 to be cut as shown in Figure 3. The purpose of the shoulder 16 and the flange on the bushing 12 is to hold the disk rigidly against a knife so as to permit of no side play between the disk and knife.

In order to hold the material to be cut in a rigid position over the cutting edge of the knife and permit it to pass slightly stretched, between the two cutting edges of the knife and the disk there is provided two rollers 26 and 27 which are secured in the bearings on the double shanked lever 28, pivoted on the shaft or spindle 10 as shown in Figure 6. One shank of the lever 28 extends beyond the pivotal point and connects by means of a link 31 to a lever 33, which is pivoted on the bolt 20 and provided with a handle or pedal 34. This pedal may be pressed downwardly and thus, against a tension of the spring 35, cause the rollers 26 and 27 to engage with the material and roll over the material and hold it as described against the cutting table.

The housing 1 is provided with a handle 36 fastened thereto by means of the bolt 37. This handle is for the purpose of manipulating the machine and press the driving wheel or gear 2 against the table and cause the disk 11 to be rotated and cut the material as stated in co-operation with the knife 23.

The two guides 40 and 41 that are placed on either side of the knife 23 and wheel 11 are fastened to the sides of the housing 1 and are provided for the purpose of guiding the cut edges of the material 4 and roll up or pass the material away from the driving gear as shown in Figure 4.

The sharpening device for the disk 11 consists of a lever 45 pivoted between bearing lugs 46 forming part of the housing 1 and is provided at one end with a slot 47 in which is located a pin 48, also secured to the housing and a spring 49 interposed between the lever and the wall of the housing to normally hold the lever against the limiting pin 50 secured to pin 48. At the opposite end of the lever 45 the grinding or sharpening wheel 52, which is conical in shape and of carborundum or other suitable material, is rotatably mounted in such a manner that the screw 53, which is secured in the housing, when screwed in against the side of the lever, causes the grinding wheel to come in contact with the bevelled cutting edge of the wheel or disk 11 and thus provide a sharpening means for the wheel which may be operated or function by passing the machine forth and back over the cutting table. This means is clearly shown in Figure 7.

The first modification of my invention is shown in Figures 9 and 10 and it is practically identical with the preferred form, except that the driving wheels 60 and 61 are provided on the outside of the housing 1 and carrying rubber tires to produce the necessary friction against the table and a separate gear 62 similar to gear 2, all mounted on the same shaft 63. The guiding means or rollers 26 and 27 and co-operating levers need not be provided in this mechanism as the wheels 60 and 61 perform the function of pressing the material over the edge of the knife and neither need the material guiding members 40 and 41 be provided as the wheels 60 and 61 will, as stated, run over the material and press it against the table.

The second modification shown in Figure 11 is practically identical with the first modification shown in Figures 9 and 10, except that no housing is provided. The gears and disks 11 being instead connected to a scissor blade 70, having a sharp edge at 71 lying flush with the sharp edge of the disk 11 and being provided with a handle 72 similar to that of an ordinary scissor handle. The knife 73 is similar to knife 23, except that it is pivoted on shaft 63 and extends into a loop or handle 75. The two parts or blades 70 and 73 forming a scissor with the blades normally held apart by the spring 76 and provided with a separation limiting device 77. The knife 73 and the sharp edge 71 of blade 70 as well as the sharp edge of wheel 11 constitute the scissor blades. If it is desired to use this mechanism as an ordinary scissor without rotating the disk 11 all that has to be done is to bring the two blades together, while on the other hand if it is desired to use the mechanism in the same manner as are the preferred form and the first modification, the blades are merely left apart as shown in Fig. 11, and the mechanism moved along the table with the wheels 60 and 61 in frictional engagement therewith. It may under certain circumstances be advantageous to start the cutting of the material by clipping it with the blades and then continue the cutting by means of the knife 73 and disk 11 alone. Then again when the material is to be cut in accordance with a complicated pattern it may be desirable to resort to the cutting of the material at intervals by means of the scissor blades only.

The third modification of my invention as shown in Figures 12 and 13, consists of the cutting disk 11, and knife 23, similar to the corresponding parts in the previously described modification. The disk is attached to the worm gear 80, meshing with the worm 81 attached to the shaft 82, which is an extension of the rotor shaft of an ordinary electric motor 83.

To the motor cover is attached a handle 84 on a rubber tired wheel 85, to guide the machine over the cutting table. The disk 11 and worm gear 80 are attached in a similar manner to the disk 11 and pinion 5 of the preferred form of my invention, that is, to a bushing 86, provided with nut 87 and lock-nut 88. The bushing 86 being mounted on the spindle 90 secured to the housing 91 by means of nuts 92 and 93.

The cloth or material guiding means is similar to that in the preferred form, consisting of the double lever 95 to which the rollers 26 and 27 are attached and with a gear segment 96, at the opposite end of one of the levers 95, meshing with a gear segment 96', of lever 97 that is pivoted at 98 and provided with a handle or a pedal 99. The levers 95 are pivoted on a spindle 100 rotatably mounted in the hollow spindle 90.

The switch box 105 contains the switching means for turning off and on the current for the motor and is manipulated by the pedal 99 by means of the piston 106, working against the spring 107, which spring also serves to hold the pedal 99 in released position. To the piston 106 is attached, but insulated therefrom, a contact spring 108 adapted to connect two knife blade springs 109 and 110 that are connected to the electric wires leading in to the motor as shown at 111. Thus it will be seen that the depression or pedal 99 not only serves to operate the levers 97 and 95, to lower the wheels 26 and 27 but also to close the switch contacts 109 and 110 to start the motor.

The modification shown in the fragmentary views Figs. 14 and 15 contemplates the use of a cutting disk 115 imbedded in the blade 116 in place of the knife 23 to cooperate with the disk 11. In certain cases where the material to be cut is of a peculiar texture it is more convenient to cut it by means of two rotating disks in place of a knife and disk.

It should be understood that the forms shown and described should be taken merely as illustrative of my invention and that many modifications may readily be made without departing from the spirit thereof and the invention should only be limited by the scope of the appended claims.

What I claim is:

1. The combination of a knife with a disc having a sharp edge the knife and the disc being so arranged in relation to each other as to cut cloth or other material passed between the edges of the knife and disc, a frictionally driven means for said disc including a gear wheel adapted to engage a cutting table, a housing for these elements and means at each side of the knife for gradually guiding the cut parts of the material a definite distance away from the sides of the knife in such a manner as to permit the frictionally driven means to pass freely between the two cut parts of the cloth.

2. In a mechanism for cutting cloth a combination of a series of driving gears adapted to move by frictional engagement with the cutting table, with a cutting disc adapted to be revolved by said gears, a knife having a sharp edge in close contact with a portion of the said disc and means for pressing the cloth to be cut against the cutting table over the knife immediately in front of the place where the cutting edges meet.

3. In a mechanism for cutting cloth a combination of a series of driving gears adapted to move by frictional engagement with the cutting table, with a cutting disc adapted to be revolved by said gears, a knife having a sharp edge in contact with a portion of the said disc, two rollers adapted to press the cloth against the table over the edge of the knife, one roller on either side of the knife and located immediately in front of the place where the two cutting edges meet.

4. In a mechanism for cutting cloth, a combination of a series of driving gears adapted to move by frictional engagement with the cutting table, with a cutting disc adapted to be revolved by said gears, a knife having a sharp edge in close contact with a portion of the said disc, two guiding members for the cut portions of the cloth, one for each portion and each so shaped as to guide the cut portion gradually away from the side of the knife beginning immediately back of the portion where the two cutting edges meet.

5. In combination with a circular knife, means for driving said knife, and mechanism for sharpening said knife, said mechanism including an abrasive element, a lever for rotatably mounting said element, a spring co-operating with said lever to normally hold the element away from contact with said knife and a screw co-operating with said lever for adjusting it against the tension of the spring to any fixed position desired so as to place the abrasive element in corresponding fixed relations to the edge of the knife for the grinding of the edge of the knife to correspondingly fixed amounts.

In witness whereof, I hereunto subscribe my name this 4th day of March, A. D. 1922.

JOHN HOLTZMAN.